US012130492B2

(12) United States Patent
Zhao et al.

(10) Patent No.: US 12,130,492 B2
(45) Date of Patent: Oct. 29, 2024

(54) LENS SYSTEM AND IMAGING APPARATUS (71) Applicant: Microsoft Technology Licensing, LLC, Redmond, WA (US)

(72) Inventors: Kelong Zhao, Redmond, WA (US); Xianming Huang, Redmond, WA (US); Mingjie Wang, Redmond, WA (US); Zhaohui Ru, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 601 days.

(21) Appl. No.: 17/431,642

(22) PCT Filed: Jan. 31, 2020

(86) PCT No.: PCT/US2020/015995
§ 371 (c)(1),
(2) Date: Aug. 17, 2021

(87) PCT Pub. No.: WO2020/180428
PCT Pub. Date: Sep. 10, 2020

(65) Prior Publication Data
US 2021/0389546 A1    Dec. 16, 2021

(30) Foreign Application Priority Data
Mar. 5, 2019    (CN) .......................... 201910162870.1

(51) Int. Cl.
*G02B 7/02*    (2021.01)
*G03B 17/12*    (2021.01)
(Continued)

(52) U.S. Cl.
CPC ............. *G02B 7/021* (2013.01); *G02B 7/028* (2013.01); *G03B 17/12* (2013.01); *H04N 23/55* (2023.01); *H04N 23/57* (2023.01)

(58) Field of Classification Search
CPC .......... G02B 7/02; G02B 7/021; G02B 7/022; G02B 7/023; G02B 7/025; G02B 7/026; H04N 23/54; H04N 23/55
See application file for complete search history.

(56) References Cited

U.S. PATENT DOCUMENTS

| 4,851,866 A | 7/1989 | Ciarlei et al. |
| 6,144,510 A | 11/2000 | Neil et al. |

(Continued)

FOREIGN PATENT DOCUMENTS

| CN | 100561274 C | 11/2009 |
| CN | 102023360 A | 4/2011 |

(Continued)

OTHER PUBLICATIONS

"International Search Report and Written Opinion Issued in PCT Application No. PCT/US20/015995", Mailed Date: May 11, 2020, 11 Pages.

(Continued)

*Primary Examiner* — Ephrem Z Mebrahtu
(74) *Attorney, Agent, or Firm* — Schwegman Lundberg & Woessner, P.A.

(57) ABSTRACT

The present disclosure provides a lens system having a stacked structure. The lens system comprises at least: a first lens; a second lens adjacent to the first lens, a first space formed between the second lens and the first lens; and a shim between the first lens and the second lens, the shim having at least one venting hole, the at least one venting hole connecting the first space and a second space outside the first space. The present disclosure also provides an imaging apparatus comprising the lens system described above.

10 Claims, 8 Drawing Sheets

(51) Int. Cl.
*H04N 23/55* (2023.01)
*H04N 23/57* (2023.01)

(56) References Cited

U.S. PATENT DOCUMENTS

| | | | |
|---|---|---|---|
| 7,142,373 | B2 | 11/2006 | Noguchi et al. |
| 8,049,978 | B1 | 11/2011 | Su |
| 8,235,607 | B2 | 8/2012 | Hou et al. |
| 9,998,640 | B2 | 6/2018 | Ohara |
| 2008/0068733 | A1 | 3/2008 | Chen |
| 2008/0074763 | A1 | 3/2008 | Jao et al. |
| 2008/0079846 | A1 | 4/2008 | Ikari |
| 2016/0212308 | A1 | 7/2016 | Ahn et al. |
| 2017/0261651 | A1 | 9/2017 | Powell |
| 2021/0318512 | A1* | 10/2021 | Tanaka .................. G03B 17/12 |

FOREIGN PATENT DOCUMENTS

| | | | |
|---|---|---|---|
| CN | 204903792 | U | 12/2015 |
| CN | 106122896 | A | 11/2016 |
| DE | 4433434 | A1 | 3/1996 |
| KR | 2013028954 | A * | 3/2013 |
| KR | 20130028954 | A | 3/2013 |
| TW | M404388 | U | 5/2011 |
| WO | 2009096460 | A1 | 8/2009 |

OTHER PUBLICATIONS

Su, Boris, "Condensation Reduction", Retrieved Date: https://securitytoday.com/Articles/2015/04/01/Condensation-Reduction.aspx, Apr. 1, 2015, 4 Pages.

"Notice of Allowance Issued in Chinese Patent Application No. 201910162870.1", Mailed Date: Jun. 15, 2022, 4 Pages.

"Notice of Allowance Issued in European Patent Application No. 20708930.1", Mailed Date: May 24, 2023, 8 Pages.

"First Office Action and Search Report Issued in Chinese Patent Application No. 201910162870.1", Mailed Date: Sep. 15, 2021, 12 Pages.

"Second Office Action and Search Report Issued in Chinese Patent Application No. 201910162870.1", Mailed Date: Mar. 2, 2022, 16 Pages.

"Notice of Allowance Issued in European Patent Application No. 20708930.1", Mailed Date: Aug. 31, 2023, 2 Pages.

* cited by examiner

LENS SYSTEM AND IMAGING APPARATUS

CROSS-REFERENCE TO RELATED APPLICATION

This application is a U.S. National Stage Filing under 35 U.S.C. 371 of International Patent Application Serial No. PCT/US2020/015995, filed Jan. 31, 2020, and published as WO 2020/180428 A1 on Sep. 10, 2020, which claims priority to Chinese Application No. 201910162870.1, filed Mar. 5, 2019, which applications and publication are incorporated herein by reference in their entirety.

BACKGROUND

Imaging apparatuses can broadly refer to various electronic apparatuses or mechanical apparatuses having imaging functions, such as digital cameras, Single Lens Reflex cameras, cell phone cameras, computer cameras, video surveillance cameras, microscopes, telescopes, and the like. An imaging apparatus typically employs a lens system having a stacked structure to implement imaging functions. A typical lens system includes a plurality of lenses and a plurality of shims stacked in sequence. A lens system can also be referred to as a lens group. Lenses included in the lens system may be convex lenses or concave lenses having different focal lengths, shapes, and the like. A shim is provided between any two adjacent lenses in the lens system. The shim can be used to block undesired light and can control the distance between two adjacent lenses, which can also be referred to as a shading shield, a shading plate, and the like. Typical shim types include film shim and fixing shim. A film shim may refer to a shim that is made of a film type material and has a small thickness. When a distance between two adjacent lenses is small, such as less than 0.022 mm, a film shim can be used. Commonly used film shim includes Soma shim, Mylar shim, and the like. A fixing shim may refer to a shim that is formed by plastic molding and has a large thickness. When a distance between two adjacent lenses is large, such as several times of the thickness of a conventional film shim, a fixing shim is required.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure provide a lens system having a stacked structure, the lens system comprising at least: a first lens, a second lens adjacent to the first lens, and a shim between the first lens and the second lens. A first space is formed between the second lens and the first lens. The shim has at least one venting hole, the at least one venting hole connecting the first space and a second space outside the first space. Furthermore, embodiments of the present disclosure also provide an imaging apparatus comprising the lens system according to embodiments of the present disclosure.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It should be appreciated that these implementations are discussed only for enabling those skilled in the art to better understand and thus implement the embodiments of the present disclosure, rather than suggesting any limitations on the scope of the present disclosure.

Figure 1:
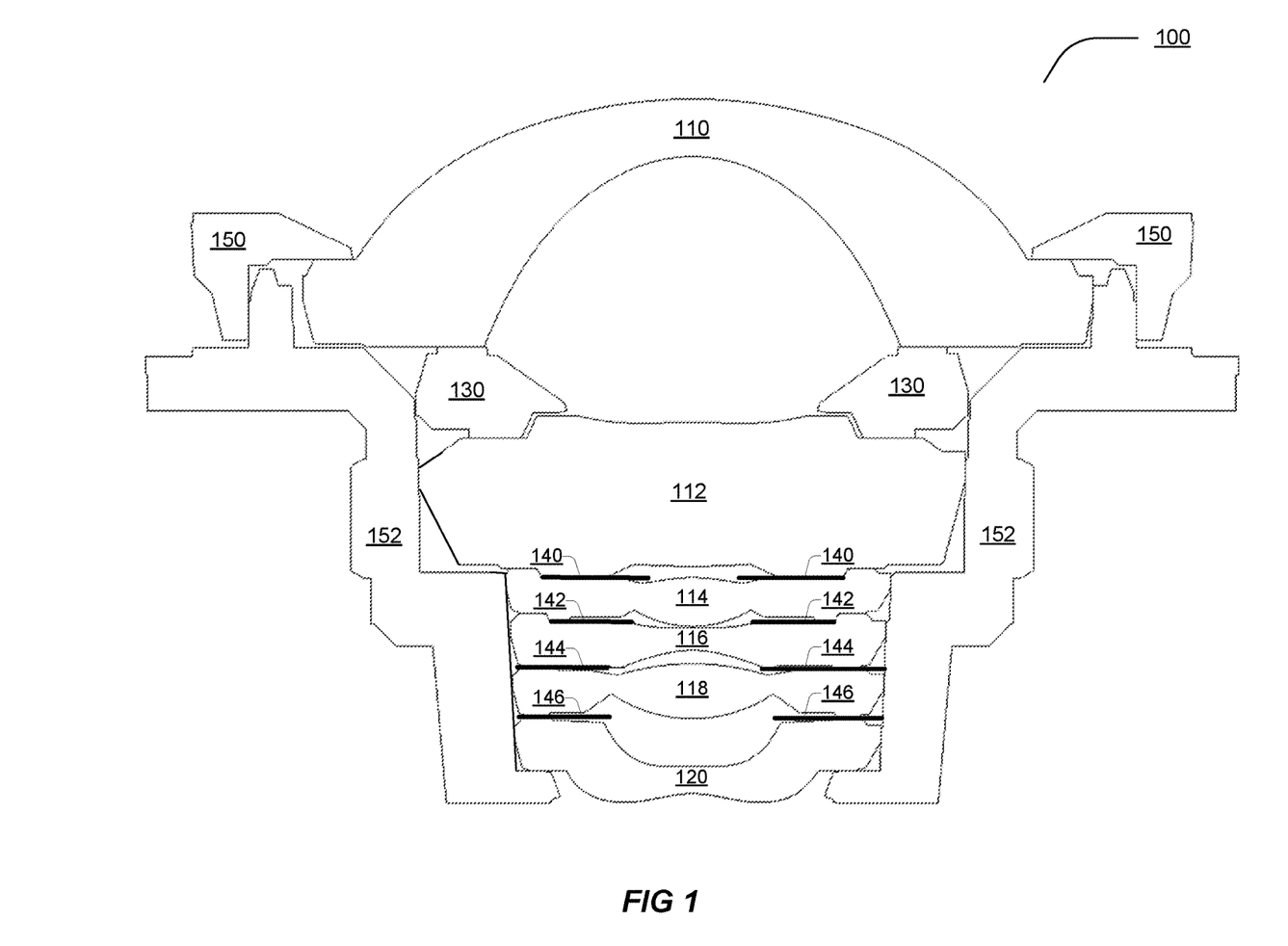
FIG. 1 is a sectional view of an exemplary existing lens system.

FIG. 1 is a sectional view of an exemplary existing lens system 100. The lens system 100 has a stacked structure. The lens system 100 includes a plurality of lenses, such as a lens 110, a lens 112, a lens 114, a lens 116, a lens 118, and a lens 120.

The lens system 100 also includes a plurality of shims, each of the shims being located between two adjacent lenses. A shim 130 is provided between the lens 110 and the lens 112. Since a distance between the lens 110 and the lens 112 is large, the shim 130 may be a fixing shim. A shim 140 is provided between the lens 112 and the lens 114, a shim 142 is provided between the lens 114 and the lens 116, a shim 144 is provided between the lens 116 and the lens 118, and a shim 146 is provided between the lens 118 and the lens 120. Since a distance between any two adjacent lenses of the lens 112, the lens 114, the lens 116, the lens 118, and the lens 120 is small, the shim 140, the shim 142, the shim 144, and the shim 146 may be film shims. Each of the shims included in lens system 100 can be sized and shaped to fit edges of two adjacent lenses that are in contact therewith. For example, the upper side of a shim may be in contact with the lower side of an edge of one lens, and the lower side of the shim may be in contact with the upper side of an edge of the other lens. The center of the shim can be hollowed out so that light can pass through it. Typically, the shape of the shim can be ring shape. Due to the stacked structure, the shim will be in close contact with the lenses on both sides thereof.

The lens system 100 also includes a housing for fixing the plurality of lenses included in the lens system 100. FIG. 1 exemplarily shows that the housing of the lens system 100 may include two components, such as an upper cover 150 and a base 152.

Figure 2:
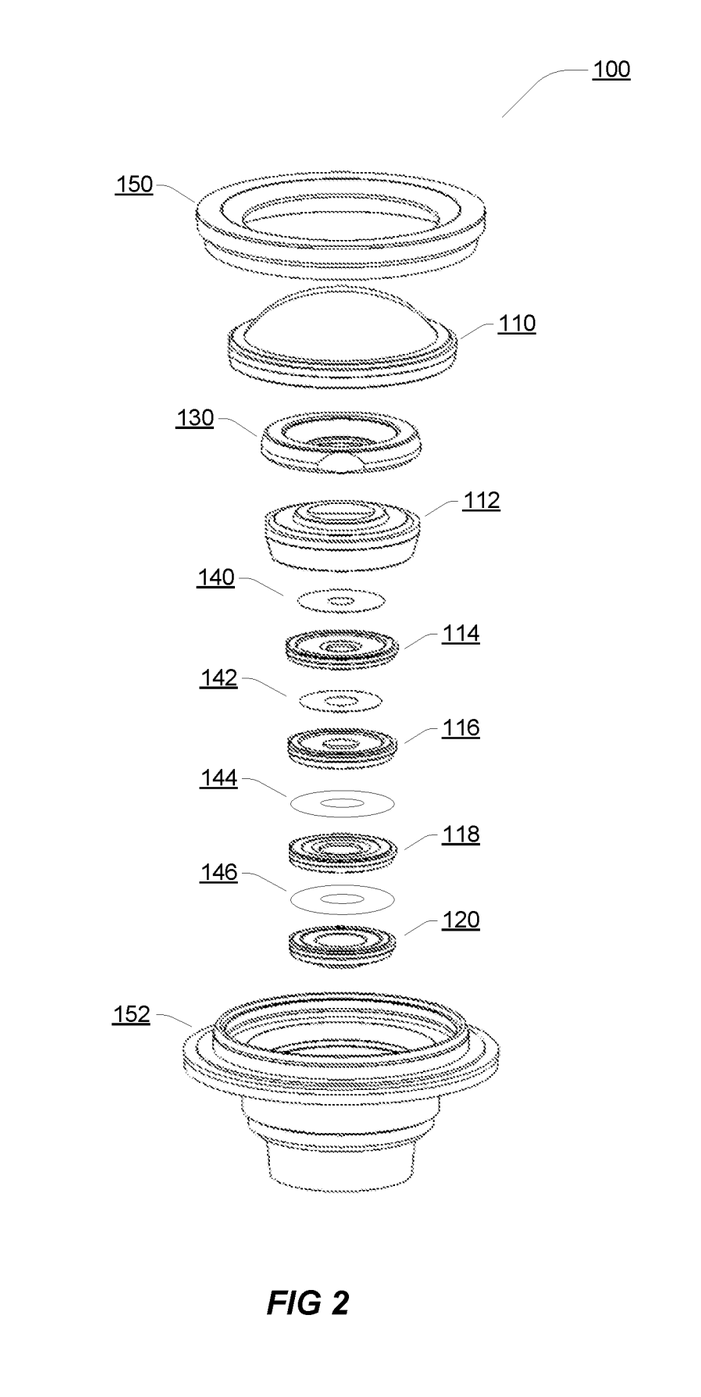
FIG. 2 is an exploded view of the lens system shown in FIG. 1.

FIG. 2 is an exploded view of the lens system 100 shown in FIG. 1 for further illustrating the structure of the lens system 100. As shown in FIG. 2, lens system 100 includes a lens 110, a shim 130, a lens 112, a shim 140, a lens 114, a shim 142, a lens 116, a shim 144, a lens 118, a shim 146 and a lens 120, which are stacked from top to bottom in this order.

It should be appreciated that the lens system 100 illustrated in FIGS. 1 and 2 is merely one example of an existing lens system. Although FIGS. 1 and 2 show that the lens system 100 includes six lenses, other lens systems may also include more or fewer lenses. Furthermore, although FIGS. 1 and 2 illustrate that the housing of the lens system 100 is composed of more than one component, such as the upper cover 150 and the base 152, the housing of other lens systems may be integrally formed. Furthermore, the shape, the stacking approach, and the like of the lens shown in FIG. 1 are merely exemplary, and the lens in the lens system may have any other shape and stacking approach according to actual application requirements.

Figure 3A:
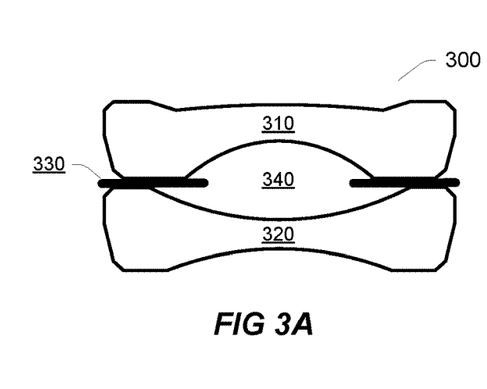
FIGS. 3A-3C illustrate exemplary deformations of an existing lens system at different temperature conditions.
Figure 3B:
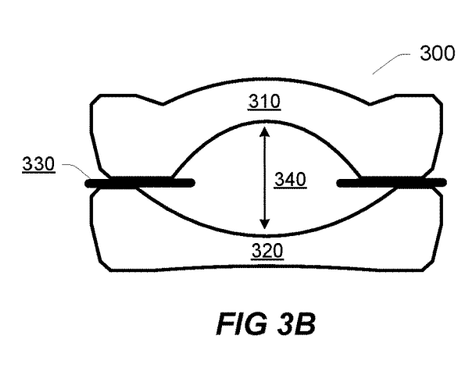
Figure 3C:
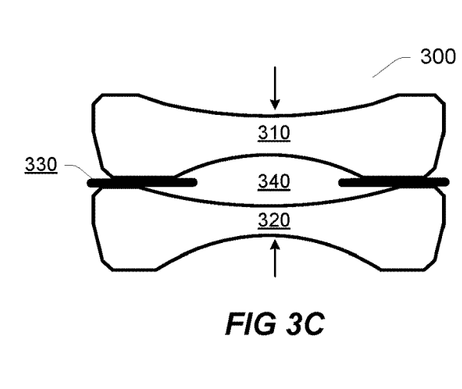

In an existing lens system, since each shim is in close contact with edges of the two lenses on both sides thereof, a confined space is formed between the two adjacent lenses. Since the air in the confined space expands or contracts due to the temperature changes, this will cause the two lenses to deform accordingly. FIG. 3A-3C illustrate exemplary deformations of an existing lens system at different temperature conditions.

FIG. 3A illustrates a sectional view of a lens system 300 in a normal temperature state. For simplicity, the lens system 300 shown in FIG. 3A includes only two adjacent lenses 310 and 320 and a shim 330 therebetween. It should be appreciated that the lens system 300 can also be part of other lens systems. As shown in FIG. 3A, shim 330 are in close contact with the lens 310 and the lens 320, respectively, thereby forming a confined space 340 between the lens 310 and the lens 320. The lens 310 and the lens 320 shown in FIG. 3A are both in a normal state.

FIG. 3B shows a sectional view of the lens system 300 in a high temperature state. When the temperature increases, the air in the space 340 expands, creating pressure on the lens 310 and the lens 320 and causing the lens 310 and the lens 320 to deform from the normal state shown in FIG. 3A. For example, the lens 310 and the lens 320 will bulge downwardly and upwardly, respectively. Such lens deformation particularly noticeable when the lens system is subjected to reliability testing since the test temperature tends to be high.

FIG. 3C shows a sectional view of the lens system 300 in a low temperature state. When the temperature decreases, the air in the space 340 contracts, creating a pulling force for the lens 310 and the lens 320 and causing the lens 310 and the lens 320 to deform from the normal state shown in FIG. 3A. For example, the lens 310 and the lens 320 will be recessed downwardly and upwardly, respectively.

It will be apparent to those skilled in the art that lens deformation can cause a change in the optical focus of lens, thereby reducing the overall imaging quality of lens system. In some cases, the lens deformation may be temporary. For example, when the temperature returns to normal temperature, a lens will return to normal state. However, in some cases, the lens deformation may also be permanent. For example, even after the temperature returns to normal temperature, it is difficult for the lens that has been deformed to completely return to the normal state, thereby causing permanent damage to the lens system.

Embodiments of the present disclosure have found lens deformation problems caused by the air in a confined space between two adjacent lenses in the event of temperature changes. In order to solve such lens deformation problems, embodiments of the present disclosure propose to form a venting hole on a shim, the venting hole connecting the confined space and a space outside the confined space so that the air can circulate between the confined space and the space outside the confined space through the venting hole. When the temperature increases, the air in the confined space expands and can circulate from the confined space to the space outside the confined space through the venting hole on the shim. Thereby, the pressure on the lenses generated by the air expansion due to the temperature increases and further lens deformation are reduced or avoided. When the temperature decreases, the air in the confined space contracts, and the air in the space outside the confined space can circulate into the confined space through the venting hole on the shim. Thereby, the pulling force on the lenses generated by the air contraction due to the temperature decreases and further lens deformation are reduced or avoided.

Figure 4A:
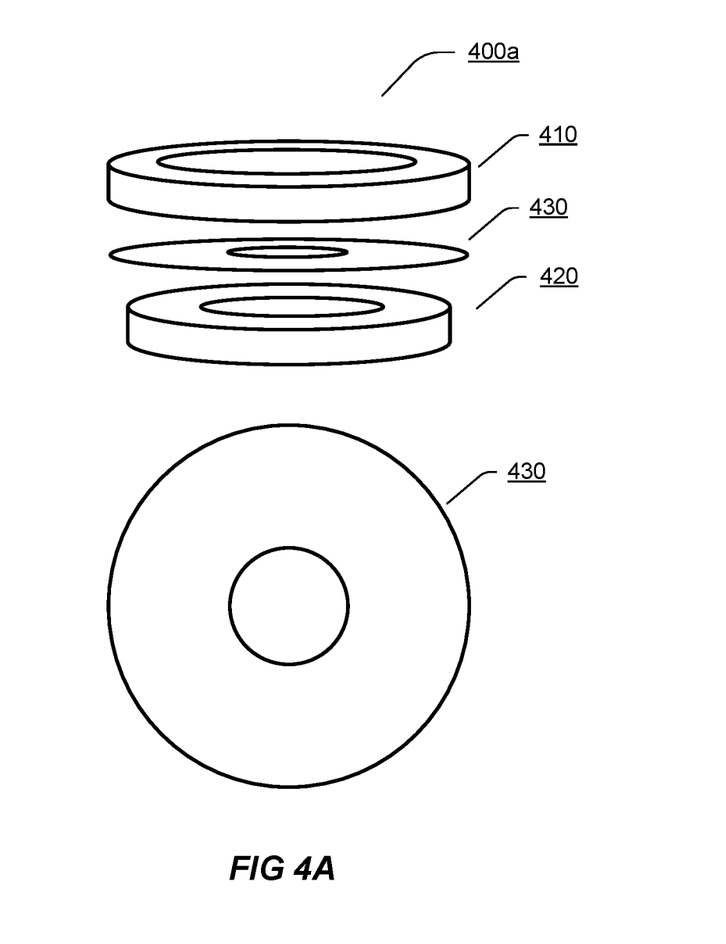
FIGS. 4A-4B illustrate an improvement to a lens system in accordance with an embodiment.
Figure 4B:
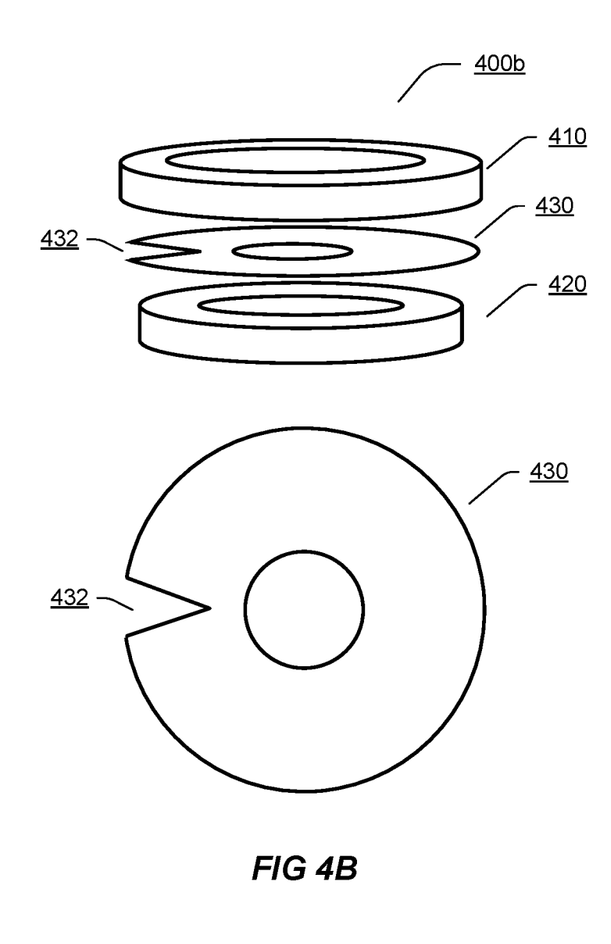

FIGS. 4A-4B illustrate an improvement to a lens system in accordance with an embodiment.

FIG. 4A illustrates an exemplary existing lens system 400a. For simplicity, the lens system 400a shown in FIG. 4A includes only two adjacent lenses 410 and 420 and a shim 430 therebetween. A top view of the shim 430 is shown in the lower part of FIG. 4A. The existing lens system 400a employs a stacked structure, and the shim 430 is in close contact with the lens 410 and the lens 420, respectively. Therefore, a confined space is formed between the lens 410 and the lens 420. The air in the confined space expands or contracts due to the temperature changes, this will cause the two lenses to deform accordingly. The shim 430 may be, for example, a film shim, a fixing shim, and the like.

FIG. 4B illustrates a lens system 400b in accordance with an embodiment. The lens system 400b is an improvement to the existing lens system 400a shown in FIG. 4A. The lens system 400b also includes the lens 410, the lens 420, and the shim 430. However, unlike the existing lens system 400a, at least one venting hole, such as a venting hole 432, is formed on the shim 430 in the lens system 400b. The venting hole 432 connects a confined space between the lens 410 and the lens 420 and a space outside the confined space. The venting hole 432 allows the air to circulate between the confined space between the lens 410 and the lens 420 and the space outside the confined space. Thus, even if the temperature changes, the lens system 400b can avoid lens deformation generated by the air expansion or contraction due to the temperature changes.

Although the venting hole 430 shown in FIG. 4B is V-shaped with its outer edge on an outer edge of the shim 430 and toward the center of the shim 430, the venting hole 430 is merely an example. According to other embodiments, the venting hole may also have other shapes, positions, and orientations, as will be discussed below. Furthermore, the venting hole 432 may be formed on the shim 430 by various manufacturing crafts or manufacturing processes, and embodiments of the present disclosure are not limited to any particular manufacturing craft or manufacturing process for forming the venting hole on the shim.

Figure 5A:
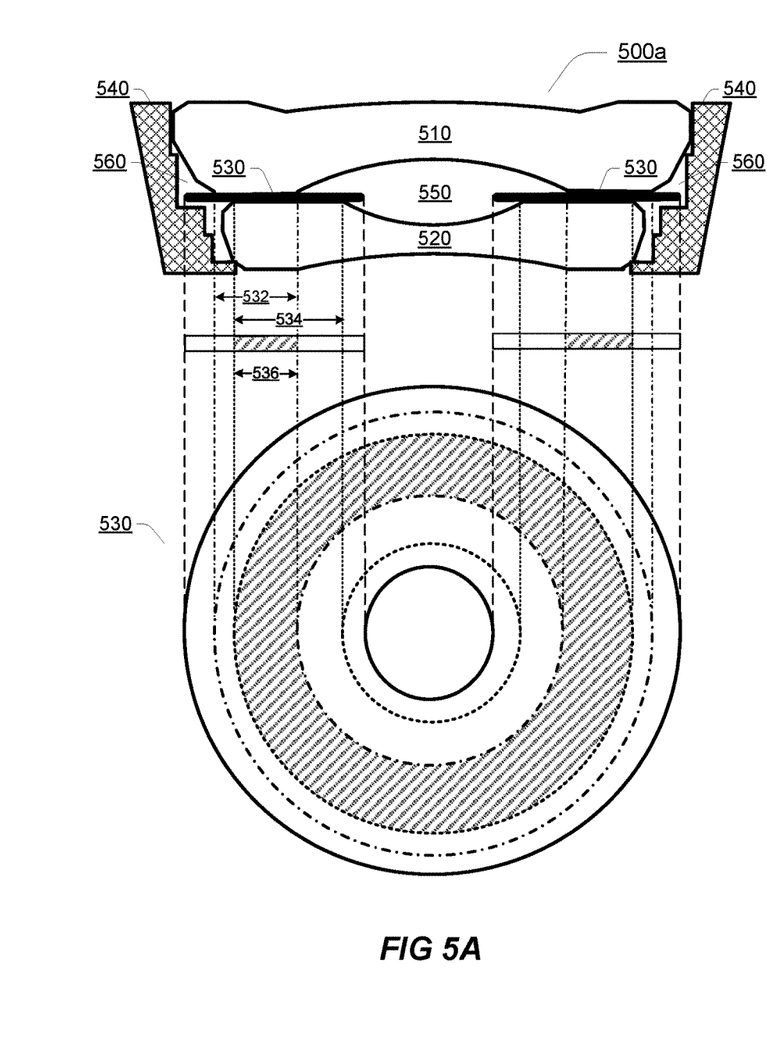
FIGS. 5A-5B further illustrate an improvement to a lens system in accordance with an embodiment.
Figure 5B:
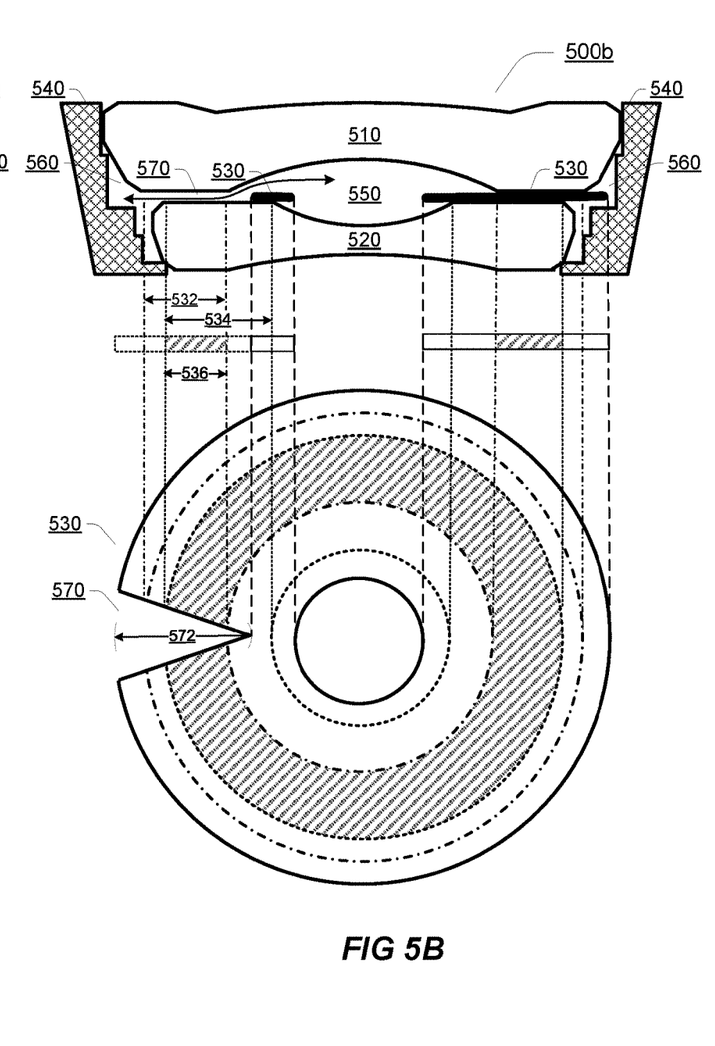

FIGS. 5A-5B further illustrate an improvement to a lens system in accordance with an embodiment.

A sectional view of an exemplary existing lens system 500a is shown at the upper part of FIG. 5A. The lens system 500a includes a lens 510, a lens 520, and a shim 530 between the lens 510 and the lens 520. The lens system 500a also includes a housing 540. The lens system 500a employs a stacked structure, and the shim 530 is in close contact with the lens 510 and the lens 520, respectively. A confined space 550 is formed between the lens 510 and the lens 520. Furthermore, a space 560 is formed among an edge of the lens 510, an edge of the lens 520, and the housing 540. As shown, the side surfaces of the edge of the lens 510 or 520 are irregular, which is common in the manufacture of lenses. Only a portion of the side surface of the edge of the lens 510 or 520 is in contact with the housing 540, and other portions of the side surface are not in contact with the housing 540. Thus, a portion of the side surfaces of the edge of the lens 510 that is not in contact with the housing 540, a portion of the side surfaces of the edge of the lens 520 that is not in contact with the housing 540, and an inner surface of the housing 540 together define a space 560. However, since the lower surface of the edge of the lens 510 is in close contact with the upper surface of the shim 530, and the upper surface of the edge of the lens 520 is in close contact with the lower surface of the shim 530, the air cannot circulate between the space 550 and the space 560. The shim 530 may be, for example, a film shim, a fixing shim, and the like.

A top view of the shim 530 drawn in solid lines is shown in the lower part of FIG. 5A. The shape of the shim 530 is shown, for example, as ring shape.

A first contact surface of the shim 530 that is in contact with the lens 510 is shown in a top view of the shim 530. The first contact surface is located on the upper surface of the shim 530. In the figure, the first contact surface is shown as a ring drawn by dot-dashed lines. The radial width of the ring corresponding to the first contact surface is indicated by reference numeral 532. As used herein, the radial width refers to the width of the pattern along the direction toward the center of the shim. For example, the radial width of the ring corresponding to the first contact surface can be calculated as the difference between the radius of the outer ring and radius of the inner ring of the ring.

A second contact surface of the shim 530 that is in contact with the lens 520 is shown in a top view of the shim 530. The second contact surface is located on the lower surface of the shim 530. In the figure, the second contact surface is shown as a ring drawn by dotted lines, the radial width of which is indicated by reference numeral 534.

The first contact surface and the second contact surface form an overlap area on the shim 530. In the top view of the shim 530, the overlap area is shown as a ring drawn in the shade, the radial width of which is indicated by reference numeral 536.

As explained above, in order to enable the air to circulate between a confined space between two adjacent lenses and a space outside the confined space, embodiments of the present disclosure propose that at least one venting hole can be formed on a shim between the two adjacent lenses, the at least one venting hole connecting the confined space between the two adjacent lenses and the space outside the confined space. FIG. 5B illustrates a lens system 500b in accordance with an embodiment. The lens system 500b is an improvement to the existing lens system 500a shown in FIG. 5A. The lens system 500b also includes the lens 510, the lens 520, the shim 530, and the housing 540. Unlike the existing lens system 500a, at least one venting hole, such as a venting hole 570, is formed on the shim 530 in the lens system 500b. The venting hole 570 connects the space 550 and the space 560.

The sectional view of the lens system 500b in accordance with an embodiment is shown in the upper part of FIG. 5B.

As shown, due to the presence of the venting hole 570 on the shim 530, a gap is created between the lower surface of the edge of the lens 510 and the upper surface of the edge of the lens 520 so that the air can circulate between the space 550 and the space 560, as shown by the double arrow line. When the temperature increases, the air in the space 550 expands, and can circulate from the space 550 to the space 560 through the venting hole 570. Thereby, the pressure on the lenses 510 and/or 520 generated by the air expansion due to the temperature increases and further lens deformation are reduced or avoided. When the temperature decreases, the air in the space 550 contracts and the air in the space 560 can circulate from the space 560 to the space 550 through the venting hole 570. Thereby, the pulling force on the lenses 510 and/or 520 generated by the air contraction due to the temperature decreases and further lens deformation are reduced or avoided.

A top view of the shim 530 is shown in the lower part of FIG. 5B, which is similar to the top view of the shim 530 in FIG. 5A, except that the venting hole 570 on the shim 530 is also shown in the lower part of FIG. 5B.

To create a gap between the lens 510 and the lens 520 such that the air can circulate between the space 550 and the space 560, the venting hole 570 on the shim 530 should extend across at least the overlap area of the first contact surface and the second contact surface on the shim 530, and the radial width of the venting hole 570 should be at least greater than the radial width of the overlap area.

In FIG. 5B, the venting hole 570 is shown as an exemplary V shape with its outer edge on the outer edge of the shim 530 and its tip toward the center of the shim 530. It should be appreciated that the venting hole 570 is merely an example. Venting holes according to embodiments of the present disclosure may also have other shapes, positions, and orientations. As shown, the venting hole 570 extends across the overlap area on the shim 530, i.e., a ring drawn in the shade. Furthermore, the radial width of the venting hole 570 is indicated by reference numeral 572, which is the distance between the outer edge and an inner edge (e.g., the tip) of the venting hole 570 in the direction toward the center of the shim 530. As shown, the radial width of the venting hole 570 indicated by reference numeral 572 is greater than the radial width of the overlap area indicated by reference numeral 536.

Considering the function of the shim itself for blocking light, if the venting hole is excessively large, it is easy to generate noises of light and cause flare phenomenon. Furthermore, if the venting hole is excessively large, the strength of the shim will also decrease. Thus, in some implementations, the venting hole 570 can be designed to be as small as possible while ensuring that the air can circulate between the space 550 and the space 560. Preferably, the radial width of the venting hole 570 should be at least less than the radial width of the shim 530.

Figure 6:
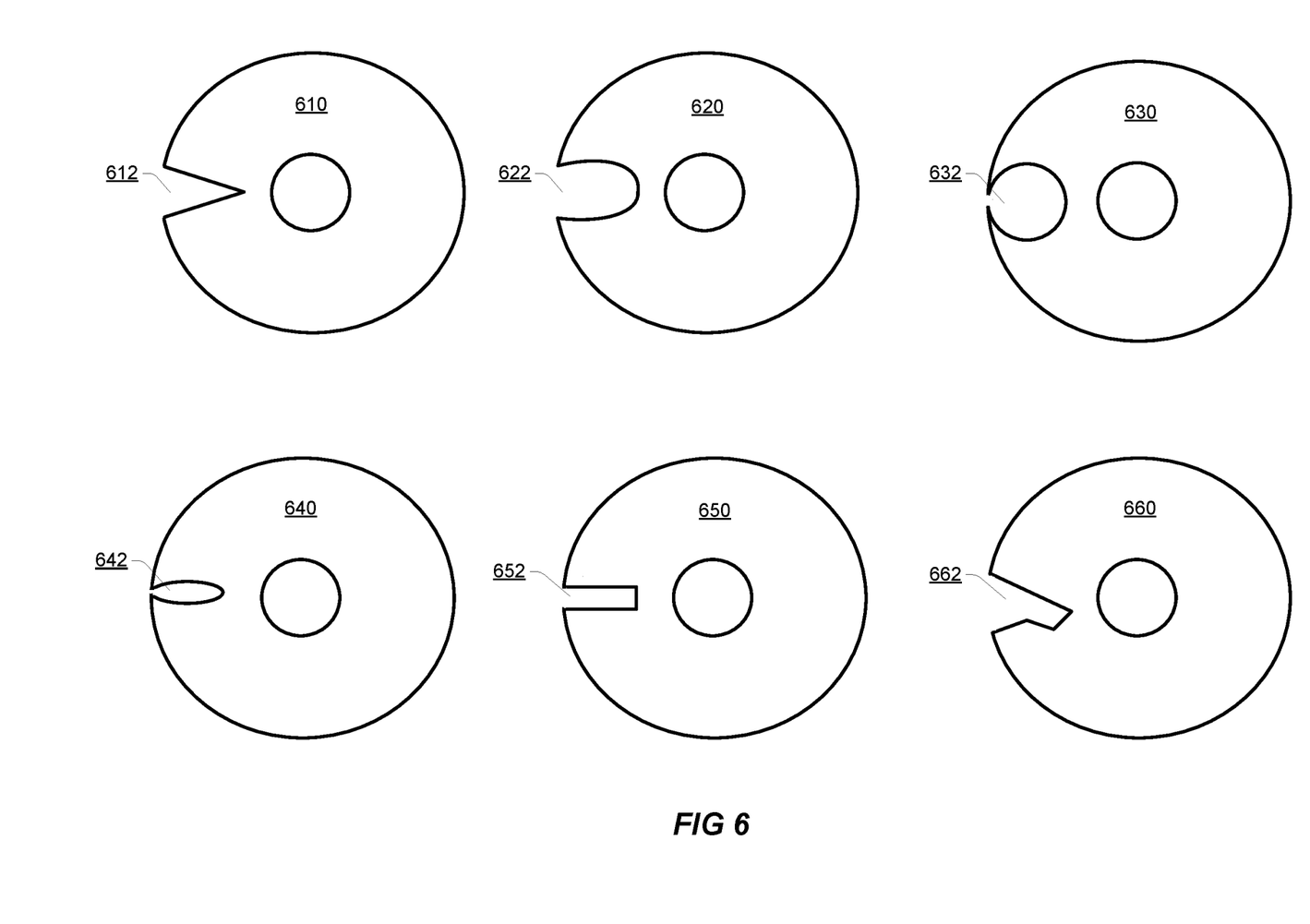
FIG. 6 illustrates exemplary shapes of venting holes on shims in accordance with embodiments.

FIG. 6 illustrates exemplary shapes of venting holes on shims in accordance with embodiments.

As shown in FIG. 6, a venting hole 612 on a shim 610 is V shaped, a venting hole 622 on a shim 620 is U shaped, a venting hole 632 on a shim 630 is circular shaped, a venting hole 642 on a shim 640 is elliptical shaped, a venting hole 652 on a shim 650 is rectangular shaped, and a venting hole 662 on a shim 660 is irregular shaped. It should be appreciated that the shapes of the venting holes shown in FIG. 6 are exemplary, and the venting holes according to embodiments of the present disclosure may also have any other shape.

Figure 7:
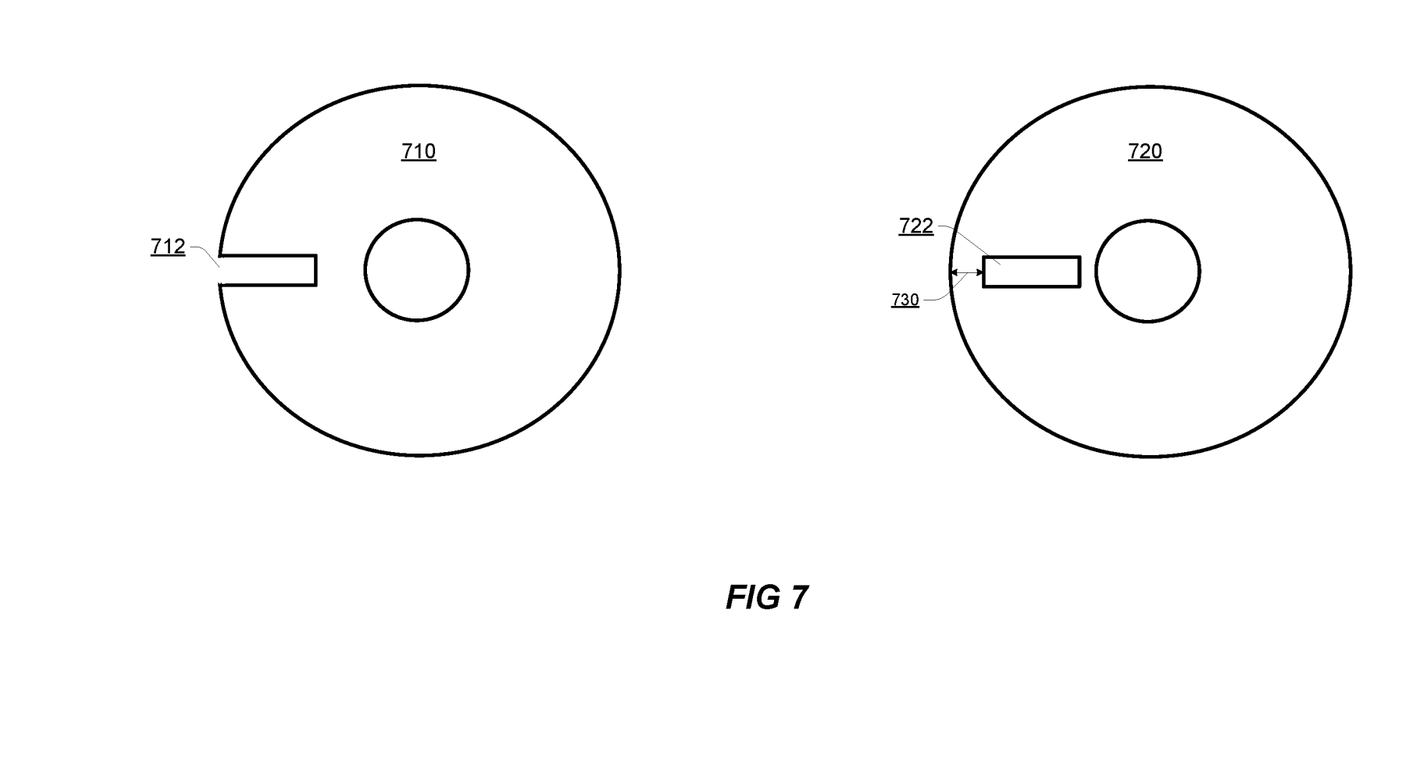
FIG. 7 illustrates exemplary positions of venting holes on shims in accordance with embodiments.

FIG. 7 illustrates exemplary positions of venting holes on shims in accordance with embodiments.

In one example, there is a rectangular shaped venting hole 712 on a shim 710. An outer edge of the venting hole 712 is located on an outer edge of the shim 710. That is, the outer edge of the shim 710 is severed by the outer edge of the venting hole 712.

In another example, there is also a rectangular shaped venting hole 722 on a shim 720. However, an outer edge of the venting hole 712 is located at a predetermined distance from an outer edge of the shim 720, which is indicated by reference numeral 730. That is, the outer edge of the shim 720 is continuous without being severed by the venting hole 722. Setting of the predetermined distance indicated by reference numeral 730 should ensure that the venting hole 722 meets design requirements of embodiments of the present disclosure discussed above. For example, the predetermined distance needs to ensure that the outer edge of the venting hole 722 is outside the overlap area on the shim, i.e., at least to ensure that the venting hole 722 can extend across the overlap area on the shim, wherein the overlap area is, for example, the overlap area drawn in the shade in the top view of the shim 530 in FIG. 5B.

It should be appreciated that although the venting holes 712 and 722 of FIG. 7 are both shown as being rectangular shaped, FIG. 7 is intended to illustrate the exemplary positions of the venting holes, which is not limited to any specific shape of venting holes.

Figure 8:
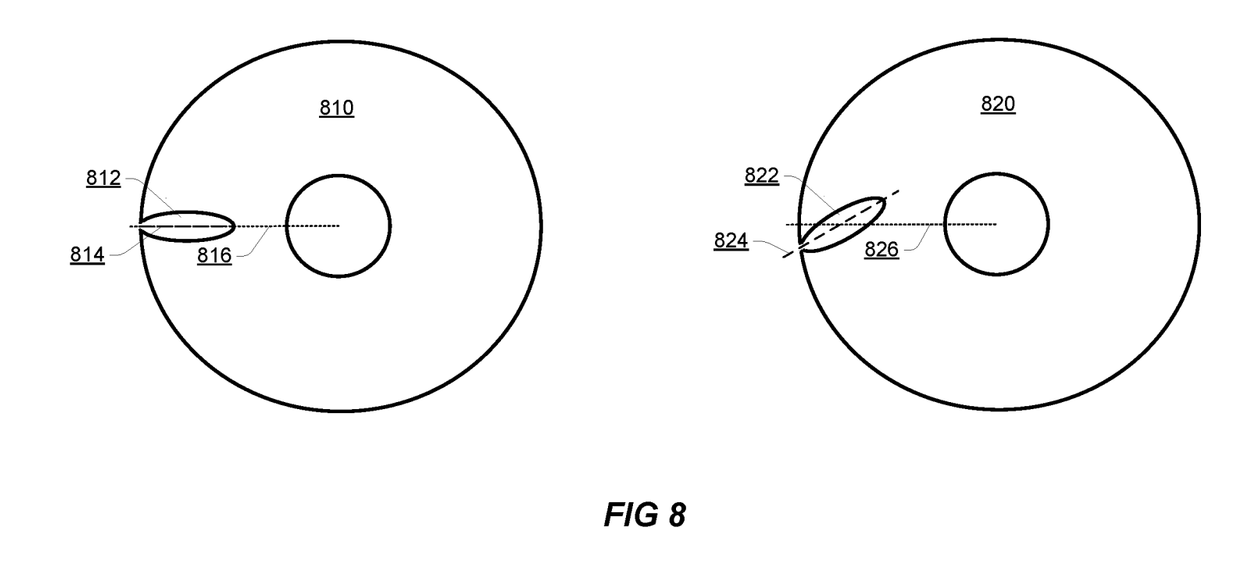
FIG. 8 illustrates exemplary orientations of venting holes on shims in accordance with embodiments.

FIG. 8 illustrates exemplary orientations of venting holes on shims in accordance with embodiments.

In one example, there is an elliptical shaped venting hole 812 on a shim 810. A line 814 (shown by a dashed line in the figure) between an outer edge and an inner edge of the venting hole 812 overlaps with the radial direction 816 (shown by a dotted line in the figure) of the shim 810. That is, the venting hole 812 is toward the center of the shim 810.

In another example, there is an elliptical shaped venting hole 822 on a shim 820. A line 824 (shown by a dashed line in the figure) between the outer edge and the inner edge of the venting hole 822 does not overlap with the radial direction 826 (shown by a dotted line in the figure) of the shim 820. Therefore, the venting hole 822 is not toward the center of the shim 820.

It should be appreciated that although the venting holes 812 and 822 of FIG. 8 are both shown as being elliptical shaped and their outer edges are both on the outer edge of the shim, FIG. 8 is intended to illustrate the exemplary orientations of the venting holes, which is not limited to any specific shape and position of venting holes.

Some exemplary implementations in accordance with embodiments of the present disclosure are described above in connection with the accompanying drawings. However, embodiments of the present disclosure are not limited to these exemplary implementations. For example, although the lens systems in FIGS. 4A-4B, 5A-5B include only two lenses and one shim, embodiments of the present disclosure can also be applied to lens systems including more lenses and more shims. In this case, venting holes may be formed on any of the shims in a lens system in a manner similar to that shown in FIGS. 4B and 5B. Furthermore, although exemplary shapes, positions, and orientations of venting holes are shown in FIGS. 6, 7, and 8, respectively, embodiments of the present disclosure may also include any other shape, position, and orientation of venting holes, as long as the venting holes can connect a space between two adjacent lenses and a space outside that, thereby ensuring that the air can circulate between the space between the two adjacent lenses and the space outside that. Furthermore, although it is shown in FIGS. 4B, 5B, 6, 7, and 8 that only one venting hole is formed on one shim, embodiments of the present disclosure may form more than one venting hole on one shim.

Lens system according to embodiments of the present disclosure can be applied to various imaging apparatus. Since the lens systems according to embodiments of the present disclosure can effectively avoid lens deformation due to the temperature changes, these imaging apparatus are accordingly capable of providing more stable imaging quality and imaging performance.

Embodiments of the present disclosure provide a lens system having a stacked structure. The lens system comprising at least: a first lens; a second lens adjacent to the first lens, a first space formed between the second lens and the first lens; and a shim between the first lens and the second lens, the shim having at least one venting hole, the at least one venting hole connecting the first space and a second space outside the first space.

In an implementation, the at least one venting hole enables the air to circulate from the first space to the second space when the temperature increases and circulate from the second space to the first space when the temperature decreases.

In an implementation, the shim has a first contact surface with the first lens and a second contact surface with the second lens, the first contact surface and the second contact surface forming an overlap area on the shim. The at least one venting hole may extend across the overlap area on the shim. The at least one venting hole may have a radial width greater than a radial width of the overlap area. The at least one venting hole may have a radial width less than a radial width of the shim.

In an implementation, an outer edge of the at least one venting hole may be located at an outer edge of the shim or at a predetermined distance from the outer edge of the shim.

In an implementation, the at least one venting hole may be toward the center of the shim or not toward the center of the shim.

In an implementation, a shape of the at least one venting hole may comprise at least one of the following: V shape, U shape, circular shape, elliptical shape, rectangular shape, and irregular shape.

In an implementation, the lens system may also include: a housing for fixing at least the first lens and the second lens. The second space is formed among an edge of the first lens, an edge of the second lens, and the housing.

In an implementation, the shim may be a film shim.

In an implementation, the shim may be a Soma shim or a Mylar shim.

Embodiments of the present disclosure also provide an imaging apparatus comprising the lens system described above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A lens system having a stacked structure and comprising at least:
   a first lens;
   a second lens adjacent to the first lens, a first space formed between the second lens and the first lens; and
   a shim between the first lens and the second lens, the shim having at least one venting hole, the at least one venting hole connecting the first space and a second space outside the first space, wherein the shim has a first contact surface with the first lens and a second contact surface with the second lens, the first contact surface and the second contact surface forming an overlap area on the shim, wherein the at least one venting hole extends across the overlap area on the shim, wherein the at least one venting hole has a radial width greater than a radial width of the overlap area.

2. The lens system of claim 1, wherein the at least one venting hole enables the air to circulate from the first space to the second space when the temperature increases and circulate from the second space to the first space when the temperature decreases.

3. The lens system of claim 1, wherein the at least one venting hole has the radial width less than a radial width of the shim.

4. The lens system of claim 1, wherein an outer edge of the at least one venting hole is located at an outer edge of the shim or at a predetermined distance from the outer edge of the shim.

5. The lens system of claim 1, wherein the at least one venting hole is toward the center of the shim or not toward the center of the shim.

6. The lens system of claim 1, wherein a shape of the at least one venting hole comprises at least one of the following: V shape, U shape, circular shape, elliptical shape, rectangular shape, and irregular shape.

7. The lens system of claim 1, further comprising:
   a housing for fixing at least the first lens and the second lens,
   wherein the second space is formed among an edge of the first lens, an edge of the second lens, and the housing.

8. The lens system of claim 1, wherein the shim is a film shim.

9. The lens system of claim 1, wherein the shim is a Soma shim or a Mylar shim.

10. An imaging apparatus comprising the lens system according to claim 1.

* * * * *